（12) United States Patent
Yanaka (10) Patent No.: US 6,467,034 B1
(45) Date of Patent: Oct. 15, 2002

(54) DATA MIRRORING METHOD AND INFORMATION PROCESSING SYSTEM FOR MIRRORING DATA

(75) Inventor: Takeshi Yanaka, Tokyo (JP)

(73) Assignee: NEC Corporation, Toyko (JP)

( * ) Notice: Subject to any disclaimer, the term of this patent is extended or adjusted under 35 U.S.C. 154(b) by 0 days.

(21) Appl. No.: 09/534,305

(22) Filed: Mar. 23, 2000

(30) Foreign Application Priority Data

Mar. 26, 1999 (JP) .......................................... 11-084208

(51) Int. Cl.⁷ .............................................. G06F 12/16
(52) U.S. Cl. ........................................ 711/162; 711/161
(58) Field of Search ................................. 711/161, 162

(56) References Cited

U.S. PATENT DOCUMENTS

| | | | | |
|---|---|---|---|---|
| 5,544,347 A | * | 8/1996 | Yanai et al. ................. | 711/162 |
| 5,742,792 A | | 4/1998 | Yanai et al. ................. | 711/162 |
| 6,044,444 A | * | 3/2000 | Ofek ........................... | 711/162 |
| 6,173,377 B1 | * | 1/2001 | Yanai et al. ................. | 711/162 |

FOREIGN PATENT DOCUMENTS

| | | |
|---|---|---|
| JP | 4-84215 | 3/1992 |
| JP | 4-352226 | 12/1992 |
| JP | 7-5996 | 1/1995 |

* cited by examiner

*Primary Examiner*—Reba I. Elmore
(74) *Attorney, Agent, or Firm*—Sughrue Mion, PLLC (57) ABSTRACT

A data mirroring method makes it possible to change the data mirroring mode among three kinds of data mirroring modes with the three kinds of modes according to the degree of burdens on the hosts and the respective controllers. A first information processing apparatus has a first host and a first disk system for sending and receiving data to and from the first host. A second information processing apparatus has a second host and a second disk system which connects the first disk system and the second disk system to each other and makes the data common to the first disk system and the second disk system. The disk mirroring method selects one of the three data mirroring modes including a synchronous mode, a semi-synchronous mode and an adaptive copy mode being different in data processing speed form one another according to the quantity of operations of the first host.

18 Claims, 4 Drawing Sheets

DATA MIRRORING METHOD AND INFORMATION PROCESSING SYSTEM FOR MIRRORING DATA

BACKGROUND OF THE INVENTION

1. Field of the Invention

The present invention relates to a data mirroring method, and more particularly to a data mirroring method and an information processing system for smoothly mirroring data in backing up data.

2. Related Art

A conventional data mirroring method is disclosed for example in U.S. Pat. No. 5,742,792, entitled "Remote Data Mirroring", and is described with reference to FIG. 5.

Figure 5:
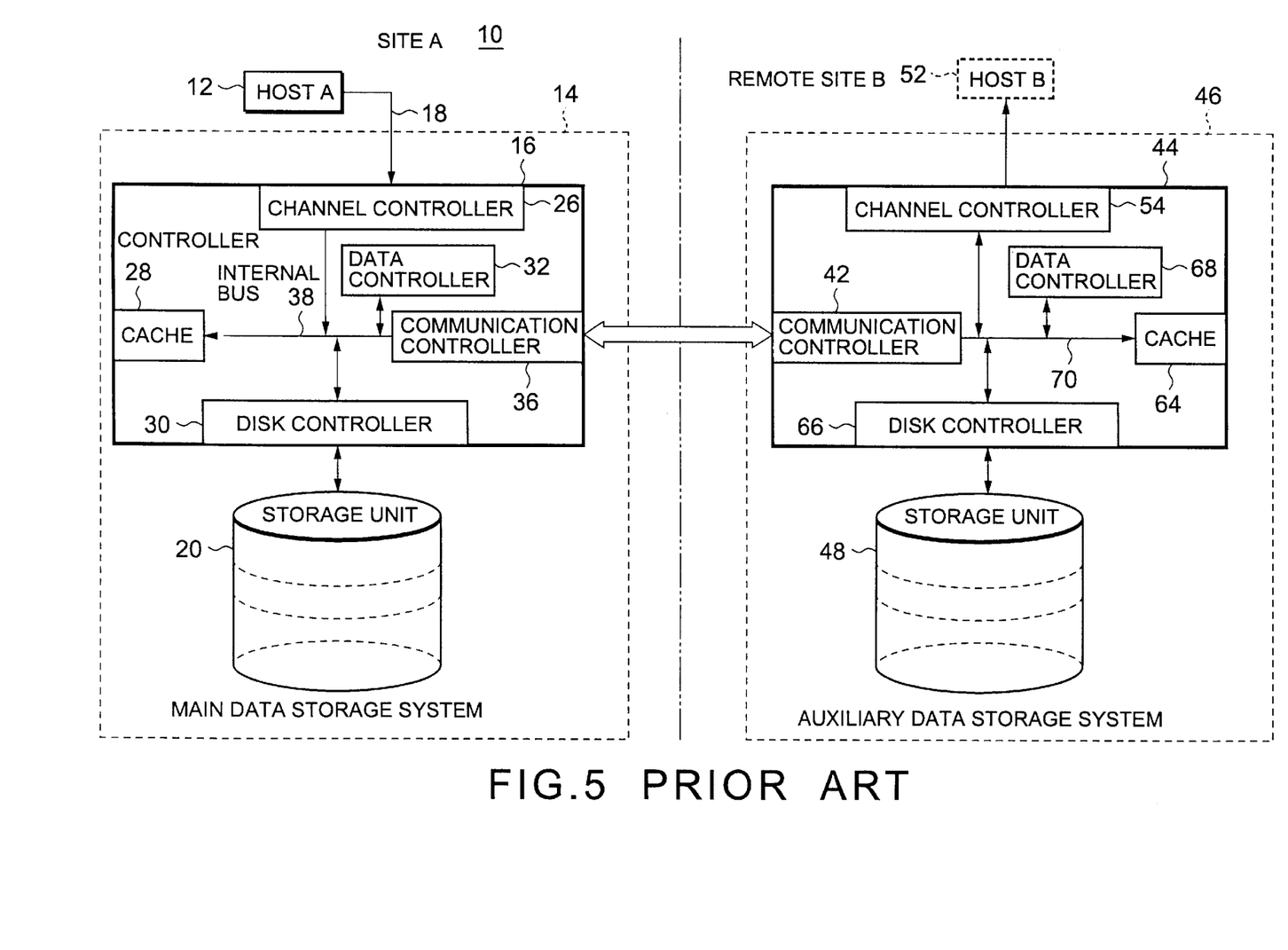
FIG. 5 is a composition diagram of a conventional data mirroring system.

In FIG. 5, a site A is composed of a host A12 and a main data storage system 14 and a remote site B remotely controlled is composed of a host B52 and an auxiliary data storage system.

The main data storage system 14 is composed of a controller 16 and a storage unit 20, and the auxiliary data storage system 46 is composed of a controller 44 and a storage unit 48.

And the controllers 16 and 44 are respectively composed of channel controllers 26 and 54 for sending and receiving data to and from the hosts 12 and 52, data controllers 32 and 68 for controlling internal buses 38 and 70, caches 28 and 64 for temporarily writing and reading data, communication controllers 36 and 42 for sending and receiving data between the site A and the remote site B, and disk controllers 30 and 66 for sending and receiving data to and from the storage units 20 and 48.

In the above-mentioned composition, in case of writing data from the host A12, mirroring modes of three kinds are shown. A first mode is called a synchronous mode, in which data to be stored are stored from the host A12 through the channel controller 26 into the cache 28, are stored through the disk controller 30 into the storage unit 20, are stored through the communication controllers 36 and 42 into the cache 64, are stored through the disk controller 66 into the storage unit 48, and after the data storing has been finished, a data completion notice is sent from the data controller 68 to the host A12 through the communication controllers 42 and 36 and through the channel controller 26. In this case, the reliability of storing data is high, but since the data completion notice is late, the host A12 results in being restrained in operation for a long time.

Next, a second mode is called a semi-synchronous mode, in which data to be stored are first sent from the host A12 to the channel controller 26 together with a write command, and when the cache 28 has received all the data the channel controller 26 sends a write command completion notice to the host A12. After this, the data to stored are stored into the storage unit 20, are stored into the cache 64 through the communication controllers 36 and 42, and are stored into the storage unit 48 through the disk controller 66. Then, after the cache 64 has received all the data, the data controller 68 sends a reception response to the data controller 32 through the communication controllers 42 and 36, and a series of data storing operations are finished. In this semi-synchronous mode, since a completion response is sent to the host A12 before a data reception response comes from the remote site B, the host A12 is made faster by a time for processing data transfer and response between the sites than the synchronous mode. From the viewpoint of data reliability, however, there is the possibility of losing data when the data are sent and received between the controllers 16 and 44.

Next, a third mode is called an adaptive copy (hereinafter, referred to as an adaptive copy) mode, in which data to be stored are first sent from the host A12 to the channel controller 26 together with a write command, and when the cache 28 has received all the data the channel controller 26 sends a write command completion notice to the host A12. The data controller 32 stores a fact that this completion notice has been performed into a queue, and if the next command has been issued from the host A12, so long as there is a free space in the storage area of the queue, the data controller 32 sends a completion notice of the said next command to the host A12. After this, at a proper timing the data controller 32 stores the data registered at the queue into the storage unit 20 and stores the data into the storage unit 48 through the communication controllers 36 and 42 and through the disk controller 66. Then, after the data controller 68 has received all the data, it sends a reception response to the data controller 32 through the communication controllers 42 and 36. Each time the data controller 32 receives the reception response, it decrements the queue, and at the point of time when the queue becomes zero, a series of write operations are completed. In this adaptive copy mode, since a completion response is sent to the host regardless of data transfer with the remote site B so long as there is a free space in the queue, the response is made faster than the second semi-synchronous mode, the semi-synchronous mode. From the viewpoint of data reliability, however, there is the possibility of losing data when a sequence of data corresponding to the number of items registered at the queue are sent and received.

As described above, in the conventional mirroring modes of three kinds, the system operates in a mode fixed by specifying one of these three modes in advance, and for example, in case that the system is set at the synchronous mode, since a command completion notice cannot be sent to the host so long as no reception response comes from the remote site even if the system is heavily loaded, the system can perform a process only in a speed of the same degree as before and this problem makes a bottleneck of the whole system performance.

And in case that a system administrator attempts to change over a mirroring mode to another mirroring mode during a mirroring operation, since it has to issue a specialized command from a maintenance system accompanying a host or disk system and the intervention is performed manually, the system is most heavily loaded and there is the possibility of losing a timing at which a high-speed operation is required.

SUMMARY OF THE INVENTION

The present invention provides a data mirroring method capable of solving the above-mentioned problems, and aims at providing a data mirroring method capable of changing over the mirroring mode among the above-mentioned data mirroring modes of three kinds according to the degrees of burdens on the hosts and the respective controllers.

A data mirroring method of the present invention is a data mirroring method which, in a system provided with a first information processing apparatus composed of a first host and a first disk system for sending and receiving data to and from the first host and a second information processing apparatus composed of a second host and a second disk system, connects the first disk system and the second disk system to each other and makes data common to the first disk system and the second disk system;

said data mirroring method selecting one of data mirroring modes of at least three kinds including a synchronous mode, a semi-synchronous mode and an adaptive copy mode being different in speed of processing the data from one another according to the quantity of operations with the first host.

In a data mirroring method of the present invention, the quantity of operations with the first host is the number of commands received and responded per unit time for sending and receiving data between the first host and the first disk system.

In a data mirroring method of the present invention, the quantity of operations with the first host is the quantity of information received and responded per unit time for sending and receiving data between the first host and the first disk system.

In a data mirroring method of the present invention, the quantity of operations with the first host is related to commands received and responded and commands waiting for being processed out of the commands sent from the first host to the first disk system, and is the sum of values each of which is obtained by multiplying the number of commands fitting in an access range by a correlation coefficient determined by the access range for each command.

In a data mirroring method of the present invention, the quantity of operations with the first host is related to commands received and responded and commands waiting for being processed out of the commands sent from the first host to the first disk system, and is the sum of values each of which is obtained by multiplying the information quantity of data to be processed by the commands fitting in an access range by a correlation coefficient determined by the access range for each command.

A data mirroring method of the present invention compares the sum with the range of the said applicable sum in case of using a data mirroring mode at that point of time which has been determined in advance, keeps the data mirroring mode as it is when the sum is within the range of the said applicable sum in case of using a data mirroring mode at that point of time which has been determined in advance, and changes over the mirroring mode to a mirroring mode making it possible to display a better performance when the sum becomes larger than the upper limit of the said applicable sum.

A data mirroring method of the present invention compares the sum with the range of the said applicable sum in case of using a data mirroring mode at that point of time which has been determined in advance, keeps the data mirroring mode as the sum is when it is within the range of the said applicable sum in case of using a data mirroring mode at that point of time which has been determined in advance, and changes over the mirroring mode to a mirroring mode making it possible to display a better performance when the sum becomes larger than the upper limit of the said applicable sum.

An information processing system of the present invention is an information processing system provided with a first information processing apparatus comprising a first host and a first disk system for sending and receiving data to and from the first host, and a second information processing apparatus comprising a second host and a second disk system; wherein the first disk system and the second disk system are connected to each other, data can be made common to the first disk system and the second disk system, and the first disk system is provided with a monitoring controller for monitoring a command related to the first host and selects one of data mirroring modes of at least three kinds including a synchronous mode, a semi-synchronous mode and an adaptive copy mode being different in speed of processing the data from one another according to the quantity of operations with the first host.

In an information processing system of the present invention, the quantity of operations with the first host is the number of commands received and responded per unit time for sending and receiving data between the first host and the first disk system.

In an information processing system of the present invention, the quantity of operations with the first host is the quantity of information received and responded per unit time for sending and receiving data between said first host and said first disk system.

In an information processing system of the present invention, the quantity of operations with the first host is related to commands received and responded and commands waiting for being processed out of the commands sent from the first host to the first disk system, and is the sum of values each of which is obtained by multiplying the number of commands fitting in an access range by a correlation coefficient determined by the access range for each command.

In an information processing system of the present invention, the quantity of operations with the first host is related to commands received and responded and commands waiting for being processed out of the commands sent from the first host to the first disk system, and is the sum of values each of which is obtained by multiplying the information quantity of data to be processed by the commands fitting in an access range by a correlation coefficient determined by the access range for each command.

An information processing system of the present invention compares the sum with the range of the said applicable sum in case of using a data mirroring mode at that point of time which has been determined in advance, keeps the data mirroring mode as it is when the sum is within the range of the said applicable sum in case of using a data mirroring mode at that point of time which has been determined in advance, and changes over the mirroring mode to a mirroring mode making it possible to display a better performance when the sum becomes larger than the upper limit of the said applicable sum.

A system of the present invention is an information processing system being provided with a site A comprising a host A and a main storage system, and a remote site B remotely controlled comprising a host B and an auxiliary data storage system, wherein;

the main data storage system is provided with a controller A for controlling the said system and a storage unit A, the auxiliary data storage system is provided with a controller B for controlling the said system and a storage unit B, the controllers A and B are respectively composed of;
  channel controllers A and B for sending and receiving data to and from the hosts A and B, data controllers A and B for controlling internal buses inside the controllers A and B, caches A and B for temporarily writing and reading data, communication controllers A and B for sending and receiving data between the site A and the remote site B, and disk controllers A and B for sending and receiving data to and from the storage units A and B, and further the controller A comprises a monitoring controller connected to said channel controller A, said monitoring controller monitoring the number of commands or the quantity of information sent from the host A to the channel controller A when the same memory content is stored in the storage units A and B.

In an information processing system of the present invention, the monitoring controller changes a response mode to the host A according to the number of commands or the information quantity, and the response modes comprise;
- a synchronous mode in which data are sent to the remote site B and a reception response from the remote site B is received by the controller A and then a write comand completion notice is sent to the host A,
- a semi-synchronous mode in which after the controller A has received all the data contained in a write command and before it receives a reception response from the remote site B, a completion response is sent to the host A, but before a reception response is received from the remote site B the next write command from the host A is not accepted, and
- an adaptive mode in which after the controller A has received all the data contained in a write command and before it receives a reception response from the remote site B, a completion response is sent to the host A, and even before a reception response is received from the remote site B the next write command from the host A is accepted.

In an information processing system of the present invention, the adaptive mode is selected when the number of commands or the information quantity is larger than a first threshold value, the semi-synchronous mode is selected when it is equal to or less than the first threshold value and larger than a second threshold value, and the synchronous mode is selected when it is equal to or less than the second threshold value.

In an information processing system of the present invention, the number of commands or the information quantity is related to commands received and responded and commands waiting for being processed out of the commands sent from the first host to the first disk system, and is set as the sum of values each of which is obtained by multiplying the number of commands or the information quantity fitting in an access range by a correlation coefficient determined by the access range for each command.

The present invention provides a data mirroring method which, in a system comprising an information processing apparatus composed of a host and a disk system for sending and receiving data to and from the host which are installed at a certain spot and an information processing apparatus composed of a host and a disk system which are remote in distance from the spot, connects the respective disk systems to each other through no host and copies data from one information apparatus to the other so as to improve the reliability and secure the maintainability of one information processing system and so as to minimize an influence on the performance such as delay of response to a running job or a lowering of processing speed, said data mirroring method being capable of obtaining the optimum performance of a system as a whole by automatically changing over prepared data mirroring methods of three kinds being different in processing speed through monitoring the activity of the hosts.

Figure 1:
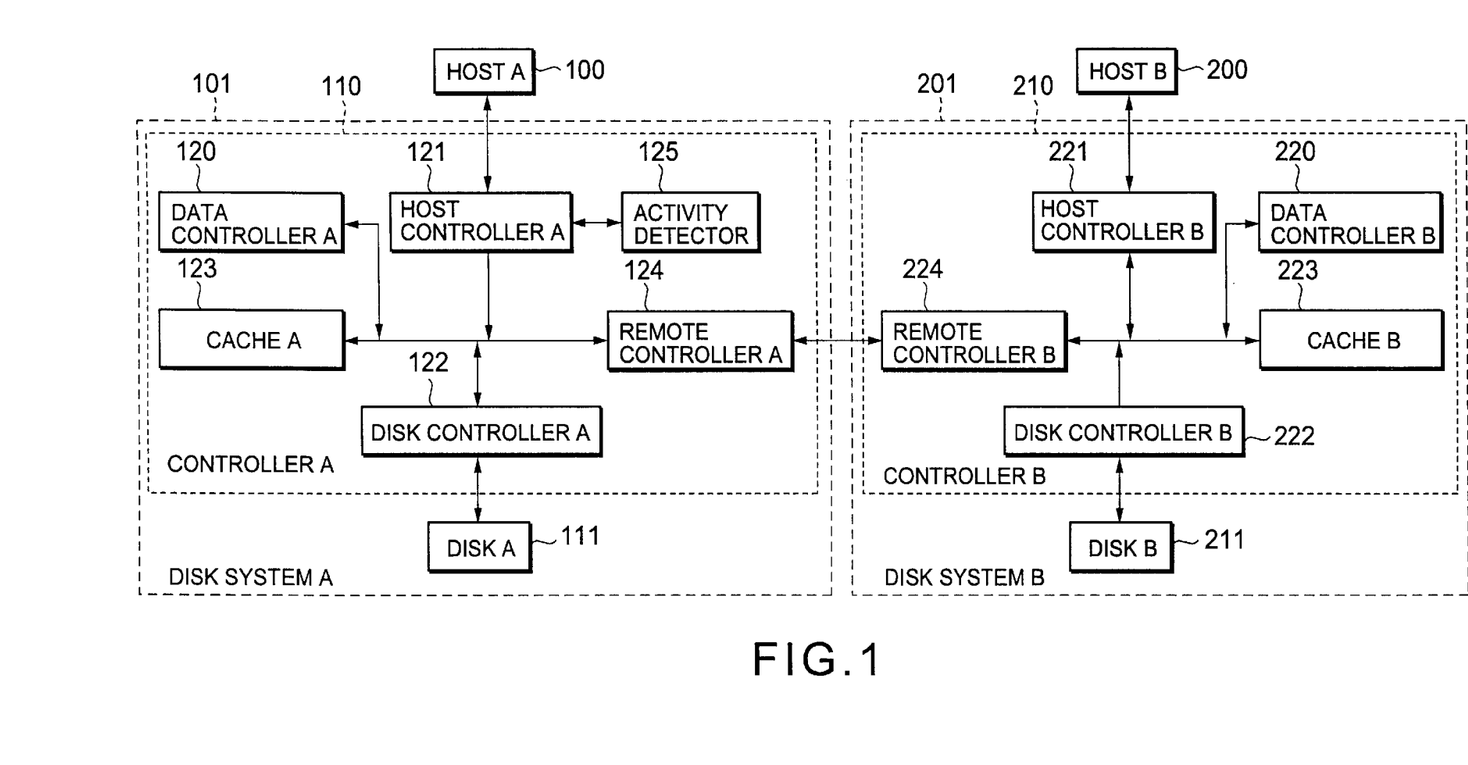
FIG. 1 is a conceptual composition block diagram of a data mirroring system of the present invention.

And describing the present invention with reference to FIG. 1, a write command from a host A100 is received by a host controller A121, and in a similar way a completion response of it is sent from the host controller A121 to the host A100. A state of reception response of the write command is monitored by a write activity detector 125. The degree of congestion of commands (the number of commands received and responded per unit time, a command queuing state, etc.) and the data mirroring mode at that point of time are compared with each other, and in case that it is recognized that the performance may be influenced, the mode is changed over to a mode capable of displaying a better performance. On the contrary, when an influence comes not to exist, the mode is changed over to such a mode as a synchronous mode in which the reliability is considered to be more important. By doing so, it is possible to keep the write performance of the system at a high level regardless of a state of command accessing of the host.

In addition, the mode is changed over to a proper mode within a range where there is no influence on the performances of a disk system and a host, depending upon the relation between the residual quantity of commands to be processed from the host to the disk system as the operation quantity of the host and the weighting of the commands in one of the current data mirroring modes of three kinds.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein;

DESCRIPTION OF THE PREFERRED EMBODIMENTS

An embodiment of the invention is described in detail with reference to the drawings.

Referring to FIG. 1, this embodiment comprises a system composed of a host A100 and a disk system A101, and a server system or computer system composed of a host B200 and a disk system B201 being installed at a spot being geographically or physically remote from that system.

The disk system A101 is composed of a controller A110 and a disk A111.

The controller A110 has a data controller A120, a host controller A121, a disk controller 122, a cache A123 and a remote controller A124 connected to one another through one bus, and is provided with a write activity detector 125 connected to the host controller A121.

Hereupon, the data controller A120 program-controls the cache A123, the host controller A121, the disk controller A122 and the remote controller A124 according to a specified control program so as to control the data flow between them at proper timing.

And the host controller A121 is in charge of response of a command and data between the host controller A121 and the host A100. The host A100 and the host controller A121 are ordinarily connected to each other through a data bus and an address bus, and they may use a parallel bus such as a PCI (Peripheral Component Interconnect) bus, an ISA (Industrial Standard Architecture) bus or the like, or a Serial bus such as RS-232C, RS-422A, USB (Univeral Serial Bus), an IEEE1394 bus or the like.

The disk controller A122 performs a process to write data into the disk A111 when the data to be written into the disk A11 exist in the cache A123.

The cache 123 stores cache information in it, and each time it has received a data read instruction from the host A100 through the host controller A121, it is utilized to judge whether or not there are data to be read out in the cache by comparing data required by the host A100 and identification information of the data stored in the cache with each other data. And the cache 123 is also utilized to temporarily store data to be written in case that the controller A110 has performed a data write instruction from the host A100 through the host controller A121.

The remote controller A124 transfers data to the remote controller B224 when the data to be transferred to the remote controller B224 exist in the cache A123 and, after the data transfer has ended, receives a data reception response signal from the remote controller B224 of the remote site.

The write activity detector 125 monitors the activity of a command received by the host controller A121, and when it recognizes that the activity has become larger than the range of an activity estimated in an operation mode at that point of time, it issues a signal to change over the mode to a mode making it possible to perform a data processing at a higher speed through the host controller A121.

The composition and operation of each component inside the disk system B201 are equal to those inside the disk system A101 from which the write activity detector 125 is removed. (Operation of this Embodiment)

Next, operation of this embodiment is described in detail with reference to FIGS. 1 to 4.

First, basic three copy modes of a method for copying data to be stored into the disk system A101 into the disk system B201 in this embodiment are described with reference to FIGS. 2 to 4.

Figure 2:
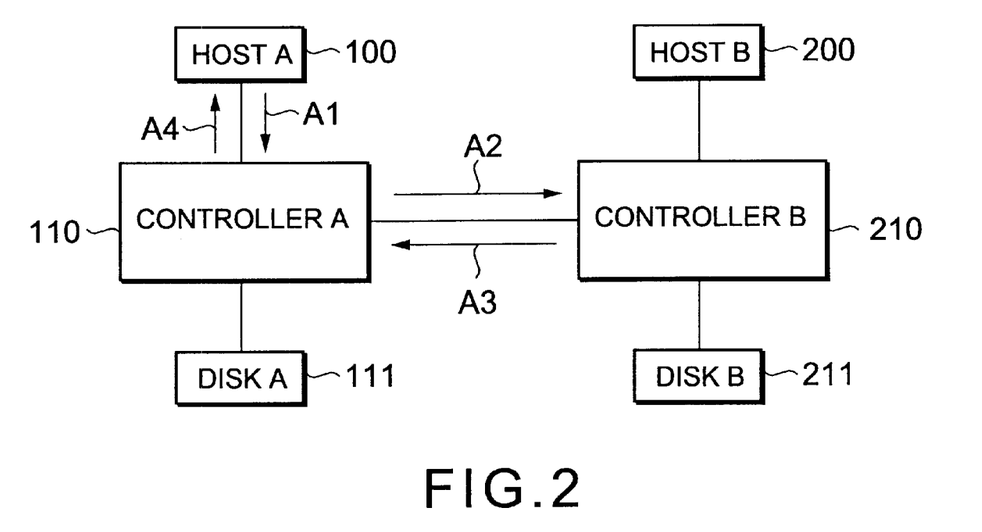
FIG. 2 is a conceptual diagram showing flow of data in a synchronous mode of a data mirroring system of the present invention.

FIG. 2 is a conceptual diagram for explaining a copy method called a synchronous mode. In FIG. 2, the flow of data is shown in steps A1 to A4. In this case, the disk system B201 in FIG. 1 is called a remote site, and it is attempted to store the same data as data to be stored into the disk A111 into the disk system B201 of the remote site. A copy in this case may be stored either into the cache B223 or into the disk B211, and in this embodiment either will do.

First, the host A100 issues a command for a data write operation to the controller A110 (step A1). The controller A110 takes in and stores the data write command and its data together into the disk A111, and sends them to the controller B210 of the remote site for copying them (step A2). The controller B210 receives all the data and then returns a reception response to the controller A110 (step A3). The controller A110 receives this reception response and then sends a write command completion notice to the host A100 (step A4).

In this synchronous mode since a command completion notice is sent to the host after a data reception response from the remote site, the longest processing time is required from the viewpoint of the host A101. However, since data are sent to the remote site and a reception response is received and then a completion response is sent to the host A100, this mode is the best in reliability of data.

Figure 3:
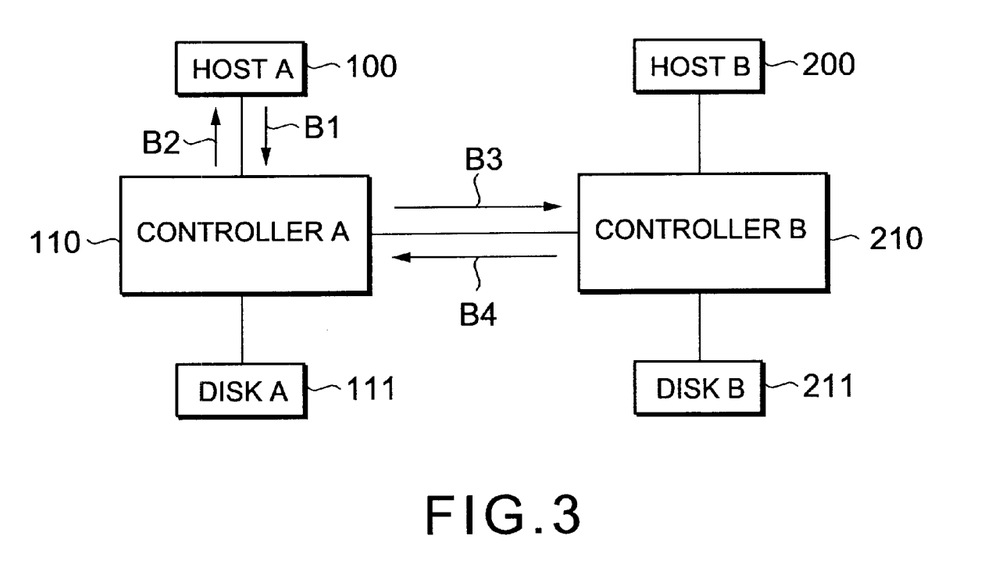
FIG. 3 is a conceptual diagram showing flow of data in a semi-synchronous mode of a data mirroring system of the present invention.

FIG. 3 is a conceptual diagram for explaining a copy method called a semi-synchronous mode. In FIG. 3, the flow of data is shown in steps B1 to B4. In this case, the disk system B201 is called a remote site.

First, the host A100 issues a command for a data write operation to the controller A110 (step B1). Immediately after the controller A110 receives all the data contained in the command, it sends a write command completion notice to the host A100 (step B2). After this, the controller A110 stores the data into the disk A111 and sends the data to the controller B210 of the remote site for copying the data (step B3). The controller B210 receives all the data and then returns a reception response to the controller A110 (step B4).

In this semi-synchronous mode, since a command completion response is sent to the host A100 before a data reception response comes from the remote site, the processing speed for the host A100 is made faster by a processing time for processing data transfer and reception response between the sites than the synchronous mode. However, a new next command from the host A100 cannot be received until the step B4 ends. That is to say, since the host A100 can start another operation by receiving a write command completion notice (step B2), this mode is made faster thanks to this, but the next command cannot be sent to the controller A110 until step B4 ends. And from the viewpoint of the reliability of data, there is the possibility of losing data of one I/O operation between steps B2 and B4.

Figure 4:
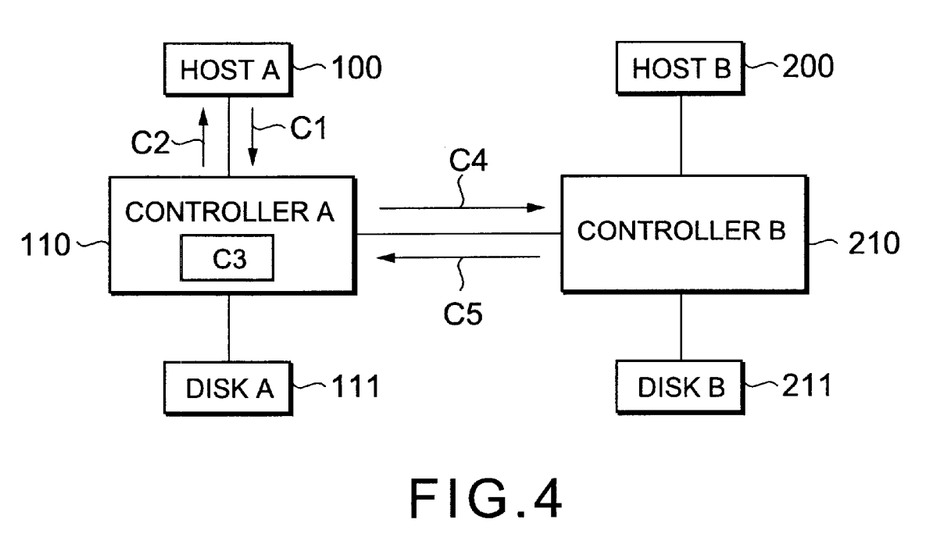
FIG. 4 is a conceptual diagram showing flow of data in an adaptive copy mode of a data mirroring method of the present invention.

FIG. 4 shows a copy method called an adaptive copy mode. In FIG. 4, the flow of data is shown in steps C1 to C5. In this case, the disk system B201 is called a remote site.

First, the host A100 issues a command for a data write operation to the controller A110 (step C1). After the controller A110 has received all the data contained in the command, it sends a write command completion notice to the host A100 (step C2). The controller A110 registers this data at the queue of the cache in the controller A110 (step C3). If the next command is issued, so long as there is a free space in the queue, steps C1 to C3 are repeated. In case that there is no free space in the queue, even if a command is issued the controller A110 does not receive this command. After this, at proper timing the controller stores the data registered at the queue into the disk A111 and sends the data to the controller B210 of the remote site (step C4). The controller 210 receives and stores the data into-the cache B223 or the disk B211, and then returns a reception response to the controller A110 (step C5).

In this adaptive copy mode, since a command completion response is sent to the host A regardless of data transfer with the remote site so long as there is a free space in the queue, commands issued one after another by the host A100 are received and therefore the response is made faster than the semi-synchronous mode. From the viewpoint of the reliability of data, however, there is the possibility of losing data of I/O operations registered at the queue.

Next, the data mirroring method and operation of the present invention are described with reference to FIG. 1.

A command issued from the host A100 is received by the host controller A121 and its data are first stored into the cache A123. A write operation to the disk system A itself is performed by the disk controller A122 from the cache A123 to the disk A111. Separately from and in parallel with this operation, for the purpose of copy, data are sent by the remote controller A124 from the cache A123 to the remote controller B224 of the disk system B201. The remote controller B224 stores the received data into the cache B223 and then immediately or after it has finished a write operation to the disk B211 through the disk controller B222, the remote controller B224 returns a reception completion response to the remote controller A124. By doing this, a copy of the data stored in the disk system A101 is made also in the disk system B201. Handling of a reception notice to be returned to the remote controller A124 or data stored in the cache A123 is controlled by the data controller A120 so as to perform a process according to a specified copy mode.

A write command from the host A100 is received by the host controller A121 and similarly a completion response to it is sent from the host controller A121 to the host A100. A state of reception response to the write command is monitored by the write activity detector 125. The write activity detector 125 checks always the number of commands or the quantity of information received and responded per unit time and the queuing state of commands wating for being processed, namely, the number of commands or the information quantity of data waiting for being processed. And the write activity detector 125 compares with each other the sum of weighted values, for example, the sum of values obtained by multiplying the number of commands fitting in an access range or the information quantity of data to be processed by the commands by a correlation coefficient determined by the access range for each command on which a reception response or a queuing process has been performed and the range of the applicable sum in case of using a copy mode at that point of time which has been determined in advance.

When the sum is within the range of the said applicable sum in case of using a data copy mode at that point of time, the write activity detector 125 keeps the data copy mode as it is, but when the sum becomes larger than the upper limit of the said applicable sum, the write activity detector 125 recognizes that the performance may be influenced and issues an instruction to change over the mode to a mode making it possible to display a better performance through the host controller A121 to the data controller A120.

The reason for such weighting is that an access range where there are data required by a command includes an access range where accesses are concentrated and the lowering of performance is liable to occur and an access range where accesses are not concentrated so much and the lowering of performance is not liable to occur, and an influence upon the performance is more exactly reflected by setting a higher correlation coefficient at the access range where accesses are concentrated.

On the contrary, if the influence comes not to exist, the mode is changed over to a mode in which the reliability is considered to be more important. By doing so, it is possible to keep the write performance of the system at a high level regardless of a state of command access from the host A100.

The above-mentioned embodiment has been described on the assumption that the host B side is a remote site in relation to the host A, but it is a matter of course that the host A side can be handled as a remote site in relation to the host B side. In this case an activity detector is provided on the host controller B221 and the number of commands or the quantity of data from the host B200 is detected at the host controller B221.

An effect of the present invention is that since it is possible to monitor the command activity of commands from a host and change over a copy mode to another copy mode making it possible to perform a more high-speed process according to the increase of a load without manually performing a copy mode change, it is possible to keep the write performance of a system at a high level at a necessary timing and regardless of a state of command access from the host.

While this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is, therefore, contemplated that the appended claims will cover any such modifications or embodiments as fall within the true scope of the invention.

What is claimed is:

1. A data mirroring method for a system provided with a first information processing apparatus composed of a first host and a first disk system for sending and receiving data to and from said first host and a second information processing apparatus composed of a second host and a second disk system comprising:
   connecting the first disk system and the second disk system to each other and making data common to said first disk system and said second disk system; and
   selecting one of data mirroring modes of at least three kinds, wherein said selection is performed automatically during a mirroring operation, and said at least three kinds of data mirroring modes include a synchronous mode, a semi-synchronous mode and an adaptive copy mode having different speeds of processing said data from one another according to the quantity of operations with said first host.

2. A data mirroring method according to claim 1, wherein; the quantity of operations with said first host is the number of commands received and responded per unit time for sending and receiving data between said first host and said first disk system.

3. A data mirroring method according to claim 1, wherein; the quantity of operations with said first host is the quantity of information received and responded per unit time for sending and receiving data between said first host and said first disk system.

4. A data mirroring method according to claim 1, wherein; the quantity of operations with said first host is related to commands received and responded and commands waiting for being processed out of the commands sent from said first host to said first disk system, and is the sum of values each of which is obtained by multiplying the number of commands fitting in an access range by a correlation coefficient determined by the access range for each command.

5. A data mirroring method according to claim 1, wherein; the quantity of operations with said first host is related to commands received and responded and commands waiting for being processed out of the commands sent from said first host to said first disk system, and is the sum of values each of which is obtained by multiplying the information quantity of data to be processed by the commands fitting in an access range by a correlation coefficient determined by the access range for each command.

6. A data mirroring method according to claim 4, said method;
   comparing said sum with the range of the said applicable sum in case of using a data mirroring mode at that point of time which has been determined in advance,
   keeping the mirroring mode as it is when said sum is within the range of the said applicable sum in case of using a data mirroring mode at that point of time which has been determined in advance, and
   changing over said mirroring mode to a mirroring mode making it possible to display a better performance when said sum becomes larger than the upper limit of the said applicable sum.

7. A data mirroring method according to claim 5, said method;

comparing said sum with the range of the said applicable sum in case of using a data mirroring mode at that point of time which has been determined in advance, keeping the mirroring mode as it is when said sum is within the range of the said applicable sum in case of using a data mirroring mode at that point of time which has been determined in advance, and changing over said mirroring mode to a mirroring mode making it possible to display a better performance when said sum becomes larger than the upper limit of the said applicable sum.

8. An information processing system comprising:

a first information processing apparatus comprising a first host and a first disk system for sending and receiving data to and from the first host, and a second information processing apparatus comprising a second host and a second disk system, wherein;

said first disk system and said second disk system are connected to each other, data can be made common to said first disk system and said second disk system, and said first disk system is provided with a monitoring controller for monitoring a command related to said first host and selects one of data mirroring modes of at least three kinds, wherein said selection is performed automatically during a mirroring operation, and said at least three kinds of data mirroring modes include a synchronous mode, a semi-synchronous mode and an adaptive copy mode having different speeds of processing said data from one another according to the quantity of operations with said first host.

9. An information processing system according to claim 8, wherein;

the quantity of operations with said first host is the number of commands received and responded per unit time for sending and receiving data between said first host and said first disk system.

10. An information processing system according to claim 8, wherein;

the quantity of operations with said first host is the quantity of information received and responded per unit time for sending and receiving data between said first host and said first disk system.

11. An information processing system according to claim 8, wherein;

the quantity of operations with said first host is related to commands received and responded and commands waiting for being processed out of the commands sent from said first host to said first disk system, and is the sum of values each of which is obtained by multiplying the number of commands fitting in an access range by a correlation coefficient determined by the access range for each command.

12. An information processing system according to claim 8, wherein;

the quantity of operations with said first host is related to commands received and responded and commands waiting for being processed out of the commands sent from said first host to said first disk system, and is the sum of values each of which is obtained by multiplying the information quantity of data to be processed by the commands fitting in an access range by a correlation coefficient determined by the access range for each command.

13. An information processing system according to claim 11, said system;

comparing said sum with the range of the said applicable sum in case of using a data mirroring mode at that point of time which has been determined in advance, keeping the mirroring mode as it is when said sum is within the range of the said applicable sum in case of using a data mirroring mode at that point of time which has been determined in advance, and changing over the mirroring mode to a mirroring mode making it possible to display a better performance when said sum becomes larger than the upper limit of the said applicable sum.

14. An information processing system according to claim 12, said system;

comparing said sum with the range of the said applicable sum in case of using a data mirroring mode at that point of time which has been determined in advance, keeping the mirroring mode as it is when said sum is within the range of the said applicable sum in case of using a data mirroring mode at that point of time which has been determined in advance, and changing over the mirroring mode to a mirroring mode making it possible to display a better performance when said sum becomes larger than the upper limit of the said applicable sum.

15. An information processing system comprising:

a site A comprising a host A and a main storage system, and a remote site B remotely controlled comprising a host B and an auxiliary data storage system, wherein;

said main data storage system comprises a controller A for controlling the said system and a storage unit A, said auxiliary data storage system comprises a controller B for controlling the said system and a storage unit B, said controllers A and B are respectively composed of:

channel controllers A and B for sending and receiving data to and from said hosts A and B, data controllers A and B for controlling internal buses inside said controllers A and B, caches A and B for temporarily writing and reading data, communication controllers A and B for sending and receiving data between said site A and said remote site B, and disk controllers A and B for sending and receiving data to and from said storage units A and B, wherein said controller A further comprises a monitoring controller connected to said channel controller A, wherein said monitoring controller monitors the number of commands or the quantity of information sent from said host A to said channel controller A when the same memory content is stored in said storage units A and B, and said monitoring controller selects one of data mirroring modes of at least three kinds, wherein said selection is performed automatically during a mirroring operation, and said at least three kinds of data mirroring modes have different speeds of processing said data from one another according to the quantity of operations with said Host A and channel controller A.

16. An information processing system according to claim 15, wherein;
  said monitoring controller changes a response mode to said host A according to the number of commands or the information quantity, and
  said response modes comprise;
    a synchronous mode in which data are sent to said remote site B and a reception response from said remote site B is received by said controller A and then a write comand completion notice is sent to said host A,
    a semi-synchronous mode in which after said controller A has received all the data contained in a write command and before it receives a reception response from said remote site B, a completion response is sent to said host A, but before a reception response is received from the remote site B the next write command from said host A is not accepted, and
    an adaptive mode in which after said controller A has received all the data contained in a write command and before it receives a reception response from said remote site B, a completion response is sent to said host A, and even before a reception response is received from said remote site B the next write command from said host A is accepted.

17. An information processing system according to claim 16, wherein;
  the adaptive mode is selected when the number of commands or the information quantity is larger than a first threshold value,
  the semi-synchronous mode is selected when it is equal to or less than said first threshold value and larger than a second threshold value, and
  the synchronous mode is selected when it is equal to or less than said second threshold value.

18. An information processing system according to claim 17, wherein;
  said number of commands or said information quantity is related to commands received and responded and commands waiting for being processed out of the commands sent from said first host to said first disk system, and is set as the sum of values each of which is obtained by multiplying the number of commands or the information quantity fitting in an access range by a correlation coefficient determined by the access range for each command.

* * * * *